United States Patent
Biadun (10) Patent No.: US 10,759,632 B2
(45) Date of Patent: Sep. 1, 2020

(54) GRAPPLE

(71) Applicant: VOLVO CONSTRUCTION EQUIPMENT AB, Eskilstuna (SE)

(72) Inventor: Krzysztof Biadun, Polkowice (PL)

(73) Assignee: Volvo Construction Equipment AB, Eskilstuna (SE)

( * ) Notice: Subject to any disclaimer, the term of this patent is extended or adjusted under 35 U.S.C. 154(b) by 49 days.

(21) Appl. No.: 16/063,180

(22) PCT Filed: Dec. 22, 2015

(86) PCT No.: PCT/SE2015/051389
§ 371 (c)(1),
(2) Date: Jun. 15, 2018

(87) PCT Pub. No.: WO2017/111675
PCT Pub. Date: Jun. 29, 2017

(65) Prior Publication Data
US 2018/0370773 A1    Dec. 27, 2018

(51) Int. Cl.
*A01G 23/00* (2006.01)
*B66C 1/58* (2006.01)
*B66C 1/68* (2006.01)

(52) U.S. Cl.
CPC .......... *B66C 1/585* (2013.01); *A01G 23/006* (2013.01); *B66C 1/68* (2013.01)

(58) Field of Classification Search
CPC . B66C 1/585; B66C 1/68; B66F 9/142; B66F 9/143; B66F 9/144; B66F 9/18; E02F 3/404; E02F 3/4133; E02F 3/962; A01G 23/006

USPC ........ 294/104, 201; 414/622, 667, 729, 739, 414/740
See application file for complete search history.

(56) References Cited

U.S. PATENT DOCUMENTS

| | | |
|---|---|---|
| 2,596,857 A | 5/1952 | Kupka |
| 3,101,968 A | 8/1963 | Cianchette et al. |
| 3,165,345 A * | 1/1965 | Gardner .................. B66C 1/585 294/67.22 |
| 3,221,909 A | 7/1965 | Magnuson |
| 3,305,118 A * | 2/1967 | Le Grand ............. B66F 9/0655 414/704 |

(Continued)

FOREIGN PATENT DOCUMENTS

| | | |
|---|---|---|
| CA | 2159743 A1 | 4/1997 |
| CN | 203938440 U | 11/2014 |

(Continued)

OTHER PUBLICATIONS

International Search Report (dated Sep. 21, 2016) for corresponding International App. PCT/SE2015/051389.

(Continued)

*Primary Examiner* — Dean J Kramer
(74) *Attorney, Agent, or Firm* — Sage Patent Group (57) ABSTRACT

A grapple for handling logs includes a base portion connectable to a working machine portion and at least one tine connected to the base portion. The at least one tine has a protruding length from the base portion. The grapple further includes a catch arm pivotably arranged relative to the base portion. The grapple can assume configurations with different protruding lengths of the at least one tine.

15 Claims, 11 Drawing Sheets

(56) References Cited

U.S. PATENT DOCUMENTS

| | | | | |
|---|---|---|---|---|
| 3,352,442 | A | * | 11/1967 | Magnuson .............. B66F 9/065 |
| | | | | 414/704 |
| 3,485,396 | A | | 12/1969 | Lundquist |
| 3,817,567 | A | * | 6/1974 | Lull .......................... B66F 9/18 |
| | | | | 294/197 |
| 4,052,096 | A | * | 10/1977 | Wallberg ................... B66C 1/24 |
| | | | | 294/200 |
| 4,422,819 | A | * | 12/1983 | Guest ...................... E02F 3/401 |
| | | | | 37/406 |
| 4,466,494 | A | * | 8/1984 | Hanson ................... B66C 1/427 |
| | | | | 173/46 |
| 4,993,914 | A | * | 2/1991 | Riddle ................. A01G 23/006 |
| | | | | 294/115 |
| 6,098,320 | A | * | 8/2000 | Wass ....................... A01D 87/00 |
| | | | | 37/406 |
| 6,290,451 | B1 | * | 9/2001 | Ihm ......................... E02F 3/407 |
| | | | | 414/24.5 |
| 7,014,412 | B2 | | 3/2006 | Daniel |
| 7,566,197 | B2 | | 7/2009 | Westendorf et al. |
| 2002/0192065 | A1 | | 12/2002 | Underwood |
| 2005/0129494 | A1 | * | 6/2005 | Chandler .................. B66F 9/12 |
| | | | | 414/607 |

FOREIGN PATENT DOCUMENTS

| | | |
|---|---|---|
| EP | 2508462 A1 | 10/2012 |
| JP | 2014091598 A | 5/2014 |
| NZ | 211947 A | 4/1987 |
| NZ | 543546 A | 3/2010 |
| RU | 2198130 C2 | 2/2003 |
| SU | 532562 A1 | 10/1976 |
| WO | 8402543 A1 | 7/1984 |

OTHER PUBLICATIONS

"Hydraulic Extendable Forks" http://www/telescopicforks.com/products/hydraulic-extendable-forks/.

European Search Report (dated Dec. 6, 2019) for corresponding European Application 15905646.4, 7 pages.

Russian Office Action dated Jul. 24, 2019 for Russian Patent Application No. 2018 126 089, 10 pages (includes English translation).

* cited by examiner

GRAPPLE

BACKGROUND AND SUMMARY

The present disclosure relates to a grapple for handling logs. Moreover, the present disclosure relates to a working machine comprising a grapple. Further, the present disclosure relates to a method for changing the gripping configuration of a grapple.

In a logging industry, a main concern is transportation of logs. Subsequent to log cutting and processing on site, logs are loaded onto vehicles and moved to a processing facility. At the processing facility, the logs are unloaded from vehicles, usually by the use of wheel loaders, and loaded in stacks or in bunkers where they remain until they are picked up for further processing. Additionally, stacked logs may be sorted and/or moved to another location.

Loading, unloading and sorting is usually performed by wheel loaders equipped with dedicated attachments. Such an attachment is generally referred to as a timber grapple or simply a grapple. A grapple generally comprises a base portion, e.g. a frame, and a catch arm that is articulated, i.e. pivotably connected to the base portion. For instance, a grapple may comprise hydraulic cylinders attached to the frame and the catch arm. The purpose of the articulated catch arm is to hold logs by applying contact force from the catch arm and the frame to the logs thus enabling that logs can be moved safely. An example of a grapple is disclosed in CN201124415 Y.

However, a prior art grapple, such as the one disclosed in CN201124415 Y, is often designed for one type of log handling, such as sorting or loading, and this generally renders the grapple unsuitable for other types of log handling operations.

It is desirable to obtain a grapple that is more versatile than the prior art grapples.

As such, the present disclosure relates to a grapple for handling logs. The grapple comprises a base portion connectable to a working machine portion and at least one tine connected to the base portion. The at least one tine has a protruding length from the base portion. The grapple further comprises a catch arm pivotably arranged relative to the base portion.

According to the present disclosure, the grapple can assume configurations with different protruding lengths of the at least one tine.

Grapples, in particular large grapples, i.e. grapples that are adapted to handle a large amount of logs at the same time, can generally be used for at least two different types of log handling operations, viz unloading and sorting.

When unloading logs with a grapple, it is generally preferred that the at least one tine is relatively short in order not to damage the logs or the vehicle onto which the logs are loaded. On the other hand, when sorting logs with a grapple, it is generally preferred that the at least one tine is relatively long such that the tine can slide along the ground so that the grapple can be easily filled when loading from stacks and sorting bunkers.

By virtue of the fact that the grapple according to the present disclosure can have different protruding lengths of the at least one tine, the grapple can be used for both of the above log handling operations. Thus, not only does the grapple according to the present disclosure imply a cost save, since an operator can use one single grapple for both the operations rather than two different grapples, but the above grapple also implies an increase in log handling efficiency since the time required for changing the length of the at least one tine can be made shorter than the time required for changing grapples.

Optionally, the grapple can assume at least two gripping configurations, each one with an open condition and a closed condition, with different protruding lengths of the at least one tine. As such, a change in protruding length is generally initiated by an operator and the grapple configuration with the new protruding length can thereafter generally be used for a work cycle that comprises opening and closing the grapple. For instance, one gripping configuration may be an unloading configuration and another gripping configuration may be a sorting configuration. Generally, the protruding length of a sorting configuration may be larger than the protruding length of the unloading configuration.

Optionally, the grapple is adapted to assume the open condition and a closed condition, respectively, by pivoting the catch arm relative to the base portion.

Optionally, the grapple is adapted to assume the open condition and a closed condition, respectively, without pivoting the base portion relative to the working machine portion. As such, the grapple is optionally not a high lift grapple, i.e. a grapple with two catch arms each one of which being pivotable in relation to a working machine portion to thereby open and close the grapple.

Optionally, at least a portion of the at least one tine is adapted to be movable relative to the base portion for altering the protruding length of the at least one tine.

Optionally, at least a portion of the at least one tine is adapted to be pivotably movable relative to the base portion for altering the protruding length of the at least one tine. The fact that at least a portion of the at least one tine is pivotable implies a compact arrangement by which the protruding length can be altered.

Optionally, at least a portion, preferably all, of the at least one tine is adapted to be translatory movable, preferably rectilinearly movable, relative to the base portion for altering the protruding length of the at least one tine. The fact that at least a portion of the at least one tine is translatory movable implies that at least a portion of the tine may be located in an area protected by the base portion when the tine is in a retracted condition.

Optionally, the grapple further comprises a locking arrangement, adapted to assume at least one locking condition, in which the protruding length cannot be changed, and at least one unlocking condition, in which the protruding length can be changed. By virtue of the locking element, a desired protruding length may be maintained even during use of the grapple.

Optionally, the base portion comprises a base abutment surface and the at least one tine comprises a tine abutment surface, the locking arrangement comprising a locking member, preferably a pin, adapted to abut the base abutment surface and the tine abutment surface when the locking means assumes the locking condition.

Optionally, the base portion comprises abase opening with a base opening rim forming the base abutment surface and/or the at least one tine comprises a tine opening with a tine opening rim forming the tine abutment surface.

Optionally, the grapple comprises means for connecting the catch arm and the at least one tine such that such that a movement of the catch arm relative to the base portion can alter the protruding length of the at least one tine. As such, the pivot motion obtainable for the catch arm, which motion is generally used for opening and closing the grapple, may be used for another purpose, namely to alter the protruding length.

Optionally, the catch arm comprises a catch arm connector and the at least one tine comprises a tine connector. The catch arm connector and the tine connector are adapted to be connected to one another such that a movement of the catch arm relative to the base portion can alter the protruding length of the at least one tine.

Optionally, the grapple further comprises an intermediate connector adapted to connect the catch arm connector to the tine connector, preferably the intermediate connector comprises a pin, a wire and/or a chain. The use of an intermediate connector implies that the catch arm connector to the tine connector need not necessarily be located adjacent to one another in order to be able to alter the protruding length.

Optionally, the grapple further comprises a tine actuator, preferably a hydraulic tine actuator, connecting the at least one tine and the base portion, for altering the protruding length of the at least one tine. A tine actuator can generally be remotely operable. As such, the presence of a tine actuator implies that an operator of a working machine comprising a grapple may alter the protruding length without necessarily having to leave the working machine.

Optionally, the tine actuator is adapted to assume a locking condition preventing displacement of the at least one tine relative to the base portion. The use of the tine actuator as a locking arrangement implies that additional locking means may be omitted.

Optionally, the at least one tine comprises an initial tine portion, adapted to constitute the at least one tine in one condition of the grapple, and a separate tine extension adapted to be releasably attached to the initial tine portion to thereby obtain a new condition of the grapple. The use of a separate tine extension implies a cost efficient way of altering the protruding length.

Optionally, the grapple comprises two or more of the tines.

Optionally, the grapple can assume configurations with different distances between the two or more tines.

A second aspect of the present disclosure relates to a working machine comprising a grapple.

A third aspect of the present disclosure relates to a method for changing the gripping configuration of a grapple. The grapple comprises a catch arm and a base portion for connection to a working machine portion and at least one tine connected to the base portion. The at least one tine has a protruding length from the base portion.

The method according to the third aspect of the present disclosure comprises altering the protruding length of the at least one tine.

Optionally, the catch arm is pivotably arranged relative to the base portion and the step of altering the protruding length of the at least one tine comprises:

connecting a catch arm connector of the catch arm to a tine connector of the at least one tine and pivoting the catch arm relative to the base portion to thereby alter the protruding length of the at least one tine.

Optionally, the method further comprises connecting the catch arm connector to the tine connector by means of an intermediate connector, preferably the intermediate connector comprises a pin, a wire and/or a chain.

Optionally, the grapple further comprises a tine actuator, preferably a hydraulic tine actuator, connecting the at least one tine and the base, the step of altering the protruding length of the at least one tine comprises actuating the tine actuator to thereby alter the protruding length of the at least one tine.

Optionally, the at least one tine comprises an initial tine portion, adapted to constitute the at least one tine in one condition of the grapple, and a separate tine extension, the step of altering the protruding length of the at least one tine comprises releasably attaching the separate tine extension to the at initial tine portion.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
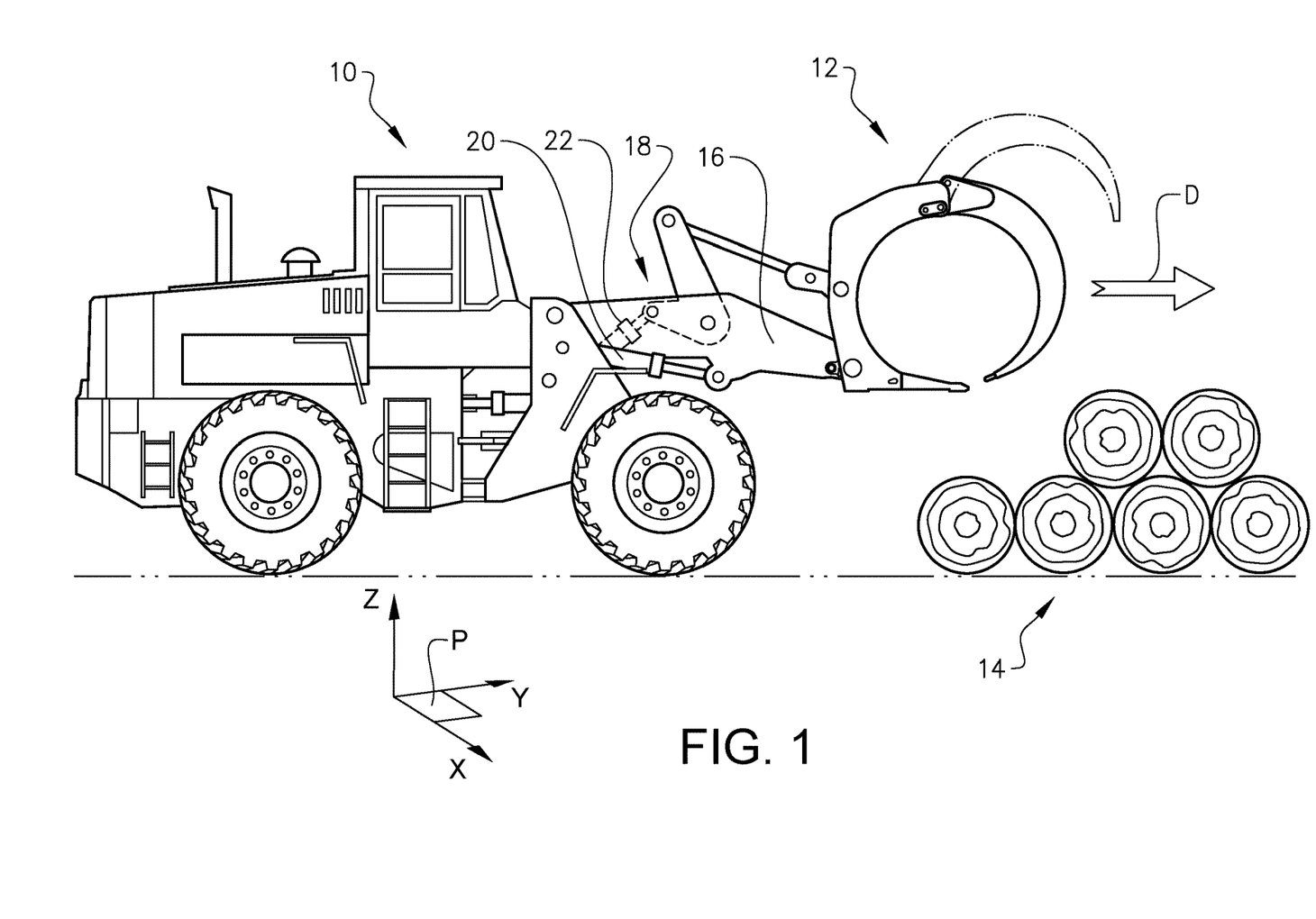
FIG. 1 is a schematic side view of a wheel loader equipped with a grapple.

FIG. 1 illustrates a wheel loader 10 that comprises a grapple 12. The grapple 12 is suitable for handling logs 14. Embodiments of the grapple 12 may be adapted to handle logs 14. However, it should be noted that a grapple 12 according to the present invention may be suitable for handling other types of objects. Purely by way of example, embodiments of the grapple 12 may be suitable for handling other types of slender objects such as pipes (not shown) or concrete reinforcement bars (not shown).

It is also envisaged that a grapple according to the present invention may be connected to another type of working machine such as an excavator (not shown). It is also envisaged that the grapple may form part of a stationary log handling assembly (not shown).

However, the grapple 12 is generally intended to handle logs by moving the grapple 12 in a direction D that has a component that extends in a horizontal plane P, viz a plane that is perpendicular to a vertical dimension Z. Thus, the grapple 12 is generally not a so called high lift grapple, viz a grapple that handles logs by moving the grapple in a vertical direction only.

In the FIG. 1 embodiment, working machine 10 comprises an arm 16 and the grapple 12 is connected to the arm 16. Moreover, the FIG. 1 working machine 10 comprises an actuating arrangement 18 for lifting and/or tilting the grapple 12. Purely by way of example, the actuating arrangement 18 may comprise one or more hydraulic actuators and/or one or more electric actuators (not shown in FIG. 1). In the FIG. 1 implementation, the actuating arrangement 18 comprises one hydraulic lifting actuator 20 and one hydraulic tilting actuator 22.

Figure 2:
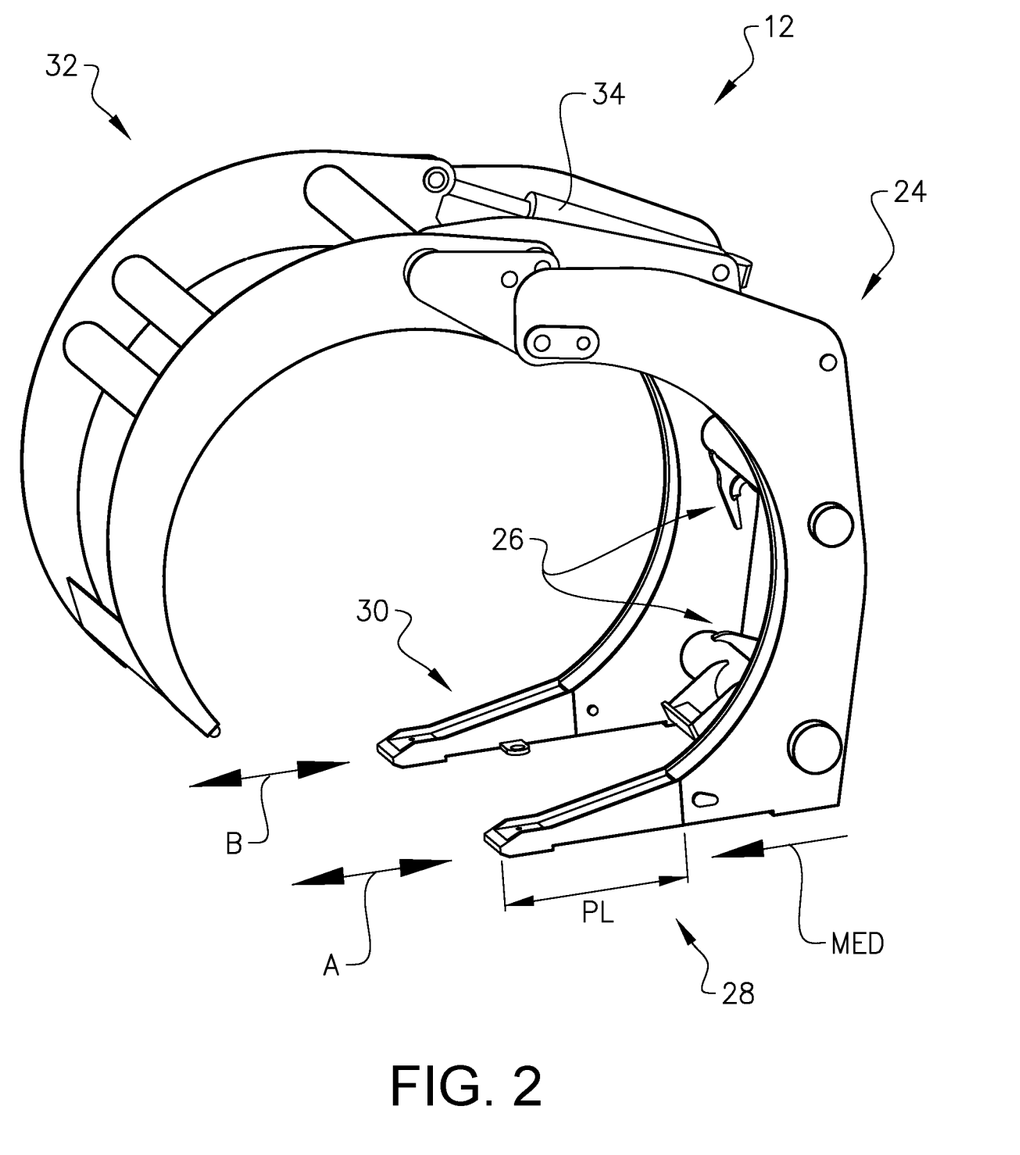
FIG. 2 is a schematic perspective view of an embodiment of a grapple.

FIG. 2 illustrates an embodiment of a grapple 12 according to the present invention. The grapple 12 comprises a base portion 24 connectable to a working machine portion, e.g. the arm of a working machine such as a wheel loader as indicated in FIG. 1. To this end, the base portion 24 comprises connection means 26 adapted to engage with means of the working machine (not shown in FIG. 2) to thereby connect the base portion 24 to a portion of the working machine. In the FIG. 2 embodiment, the connection means 26 is exemplified by brackets although it is envisaged that other types of connection means 26 may be used.

Moreover, the FIG. 2 grapple 12 comprises at least one tine connected to the base portion 24. The FIG. 2 grapple embodiment comprises two tines 28, 30 each one of which is connected directly or indirectly to the base portion 24.

The at least one tine 28, 30 has a protruding length PL from the base portion 24. As is indicated in FIG. 2, a tine 28, 30 may extend away from the base portion 24 in a main extension direction MED. Moreover, as is indicated in FIG. 2, the PL is defined as the distance from the tip of the tine 28, 30, viz the portion of the tine 28, 30 that is distal to the base portion 24, to the base portion 24.

In fact, in the embodiment illustrated in FIG. 2, each tine 28, 30 may have an elongate shape with a principal extension direction that may be substantially parallel to the main extension direction.

Further, as is indicated in FIG. 2, the grapple 12 also comprises a catch arm 32 pivotably arranged relative to the base portion 24. For instance, and as is indicated in the FIG. 2 embodiment, the grapple 12 is adapted to assume the open condition and a closed condition, respectively, by pivoting the catch arm 32 relative to the base portion 24. Moreover, as is indicated in FIG. 2, the grapple 12 may be adapted to assume the open condition and a closed condition, respectively, without pivoting the base portion 24 relative to the working machine portion (not shown in FIG. 2).

In other words, in embodiments of the grapple 12 according to the present invention, such as the FIG. 2 embodiment, changing the condition of the grapple 12 from an open condition to a closed condition, or vice versa, may be achieved by pivoting the catch arm 32 relative to the base portion 24 while the base portion 24 is stationary relative to a working machine portion. This is in contrast to a high lift grapple that generally comprises two catch arms both of which are pivotable, relative to a working machine portion, towards and away from each other in order to change the condition of the grapple.

In order to pivot the catch arm 32 relative to the base portion 24, the grapple 12 may comprise a pivot actuator 34 connected to each one of the catch arm 32 and the base portion 24. In the FIG. 2 embodiment, the pivot actuator 34 is exemplified as linear actuator, e.g. a linear hydraulic actuator, although other types of actuators are conceivable.

Further, as is indicated in FIG. 2, the grapple 12 can assume configurations with different protruding lengths PL of the at least one tine 28, 30. The ability to assume configurations with different lengths is indicated by arrows A, B in FIG. 2. For instance, as a non-limiting example, the grapple 12 can assume at least two gripping configurations, each one with an open condition and a closed condition, with different protruding lengths PL of the at least one tine 28, 30.

The different protruding lengths PL can be obtained in a plurality of ways and a few examples will be presented hereinbelow. In order to keep the presentations of the below description in a condensed form, the below presentations are focused on presenting features associated with the first tine 28. However, it should be noted that each one of the below discussed embodiments of the grapple 12 comprises means associated with the second tine 30 which means are means similar to the ones associated with the first tine 28.

Figure 3A:
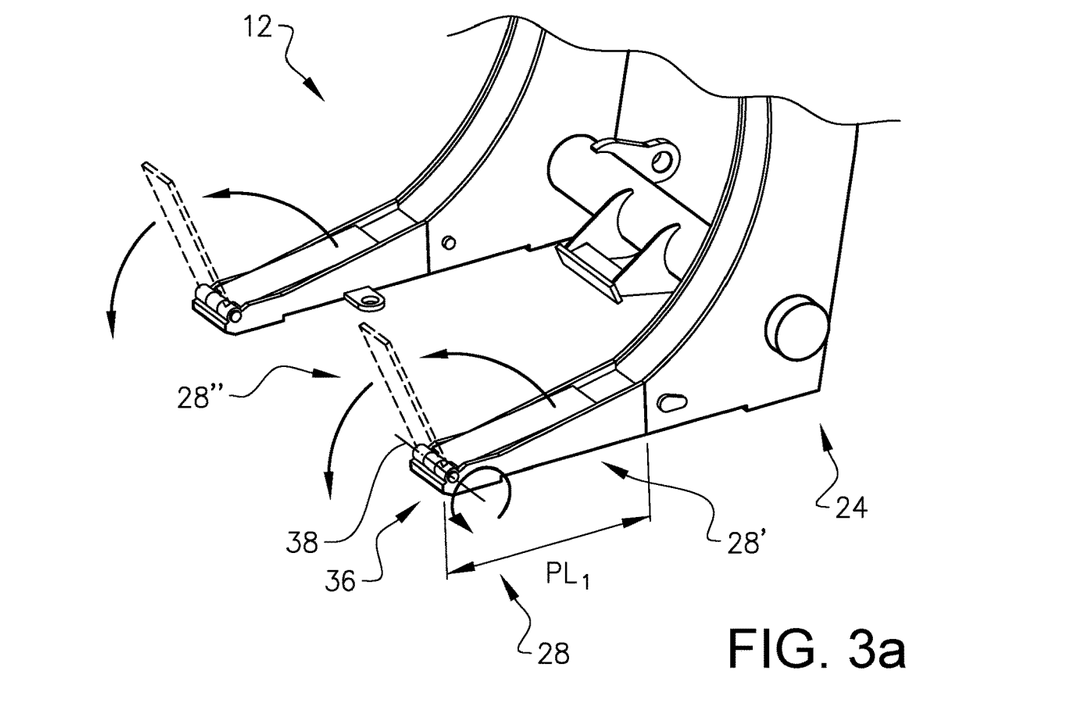
FIGS. 3a and 3b are schematic perspective views of a portion of an embodiment of a grapple.
Figure 3B:
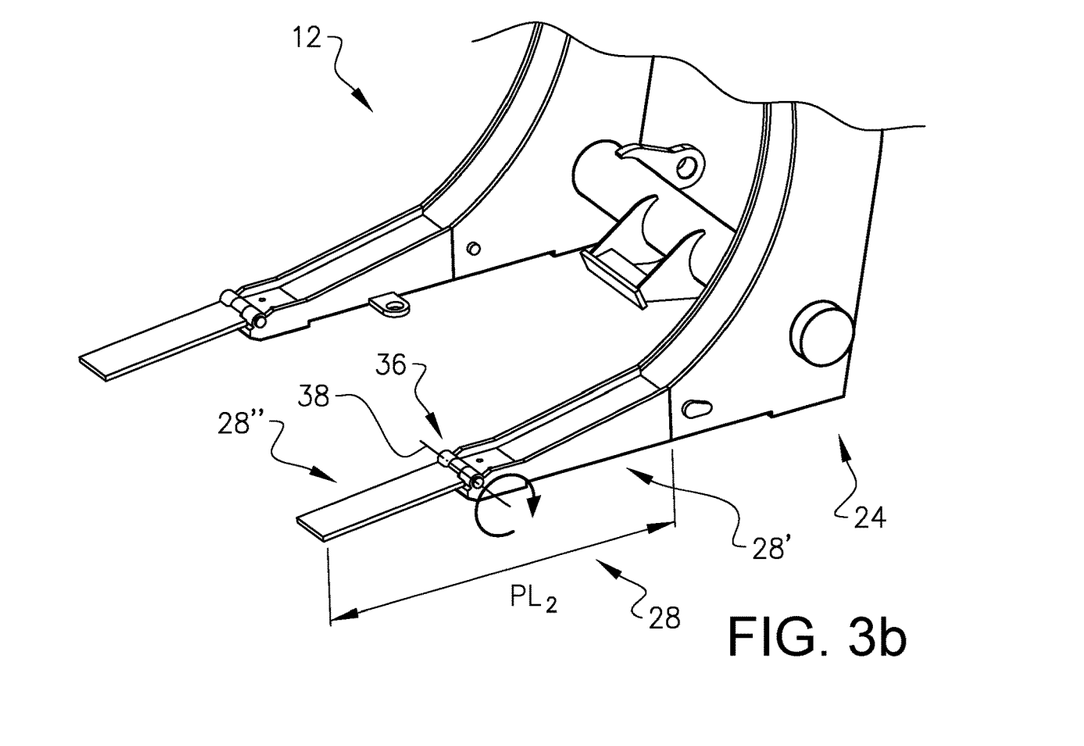

For instance, FIGS. 3a and 3b, illustrates an embodiment of the grapple 12 in which at least a portion of the at least one tine 28 is adapted to be pivotably movable relative to the base portion 24 for altering the protruding length PL of the at least one tine 28. In the FIG. 3 embodiment, the first tine 28 comprises two portions: a proximal portion 28' proximal to the base portion 24 and a distal portion 28" distal to the base portion 24. The distal portion 28" is connected to the proximal portion 28' by means of a joint 36 such that the distal portion 28" can pivot relative to the proximal portion 28'.

In the FIGS. 3a and 3b implementation of the first tine 28, the joint 36 is such that the distal portion 28" can pivot around a pivot axis 38 relative to the proximal portion 28'. In the FIG. 3 implementation, the pivot axis 38 extends in a substantially horizontal direction. As such, when the FIGS. 3a and 3b grapple 12 is placed with the tines on an even and horizontally extending ground, the pivot axis 38 extends in a direction that is substantially parallel to the ground. However, it is also envisaged that in other implementations of the tine 28, the pivot axis 38 may extend in another direction.

FIG. 3a illustrates the grapple in a first configuration wherein the first tine 28 is in a retracted condition such that the tip of the distal portion 28" faces the base portion 24. As such, in FIG. 3a, the first tine 28 has a first protruding length PL1. In FIG. 3b, the distal portion 28" has been pivoted relative to the proximal portion 28' such that the end, viz the portion distal to the joint 36, of the distal portion 28" faces away from the base portion 24. When the grapple 12 is in the FIG. 3b configuration, the first tine 28 has a second protruding length PL2 which is larger than the first protruding length PL1.

Instead of, or in addition to, the pivot option discussed hereinabove, at least a portion, preferably all, of the at least one tine 28 may be adapted to be translatory movable, preferably rectilinearly movable, relative to the base portion 24 for altering the protruding length of the at least one tine 28.

An embodiment of the grapple 12 in which the at least one tine 28 is adapted to be translatory movable is presented hereinbelow with reference to FIGS. 4a-4c. As may be gleaned from FIG. 4a, the grapple 12 can assume a first condition with a first protruding length PL1 of the at least one tine 28. Moreover, as may be realized when comparing FIG. 4a and FIG. 4c, the at least one tine 28 is adapted to be translatory movable such that the grapple 12 can assume a second configuration with a second protruding length PL2 of the at least one tine 28. In the FIG. 4a to FIG. 4c embodiment, the at least one tine 28 is moveable in a rectilinear direction. Particularly, in the FIG. 4a to FIG. 4c embodiment, the at least one tine 28 is moveable in a rectilinear direction that is substantially parallel to the main extension direction MED of the at least one tine 28.

Figure 4A:
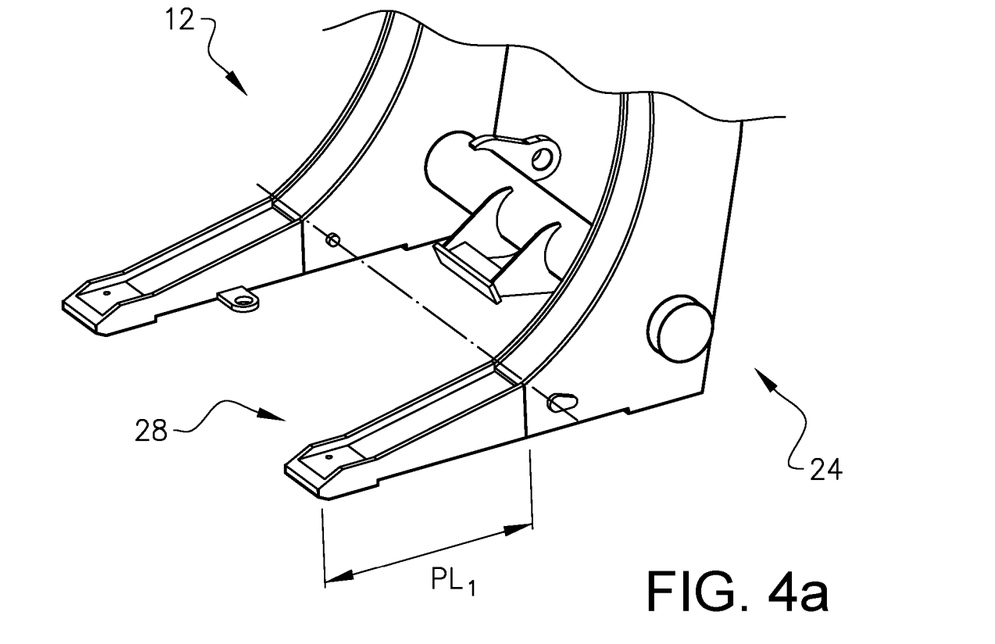
FIGS. 4a to 4c are schematic perspective views of a portion of an embodiment of a grapple.
Figure 4B:
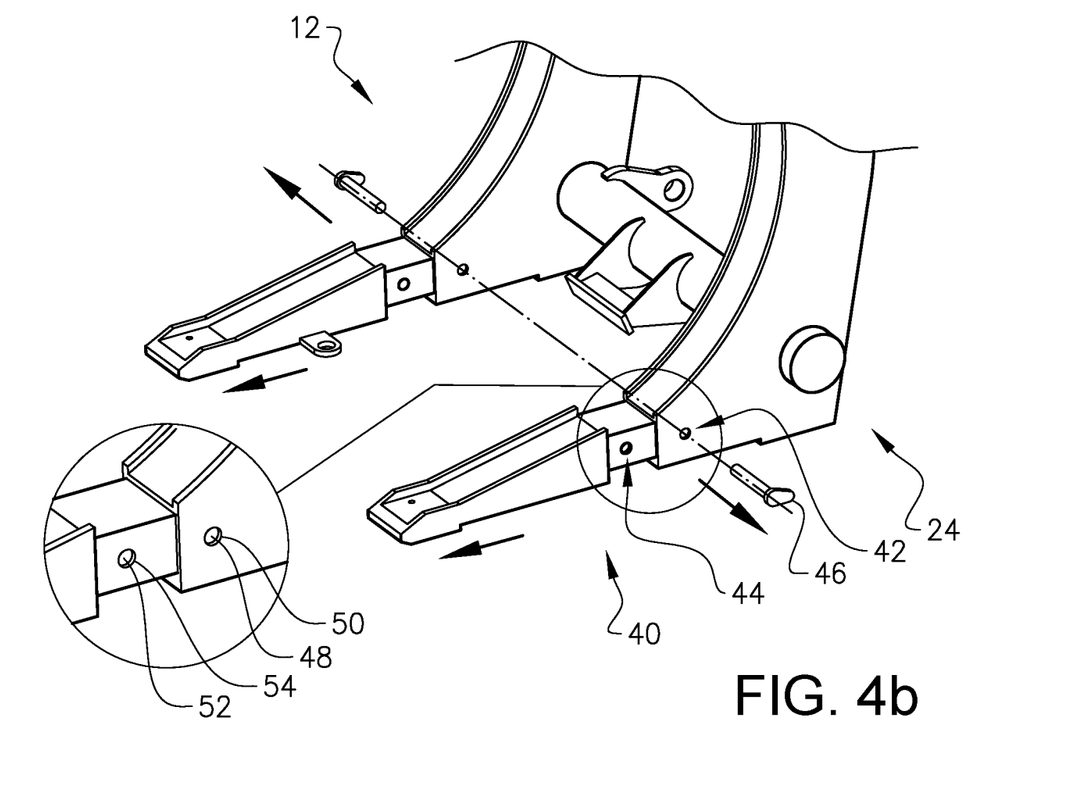
Figure 4C:
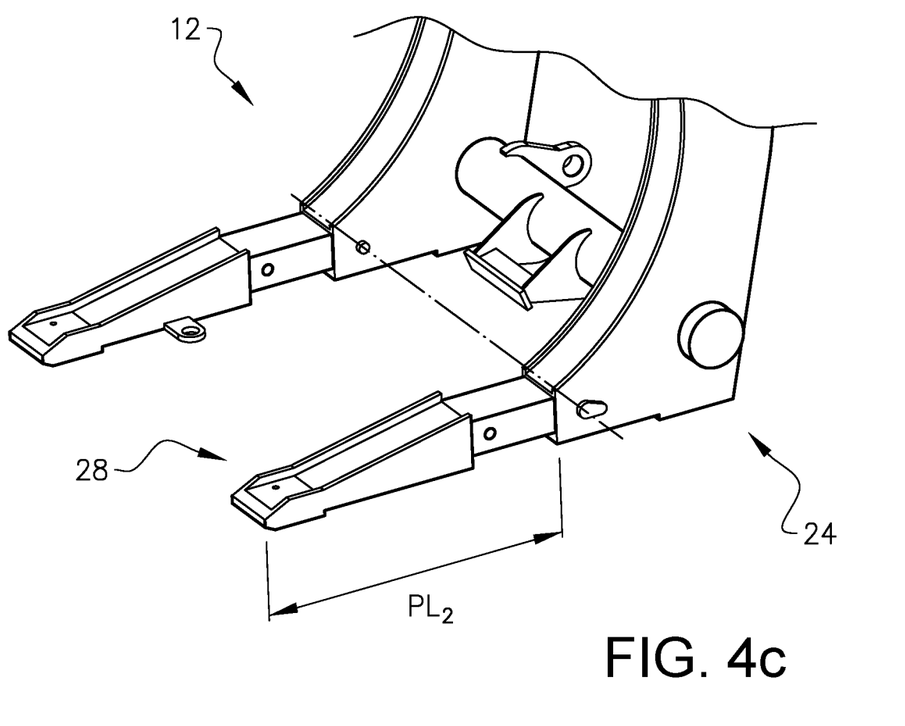

Purely by way of example, and as is indicated in FIG. 4a to FIG. 4c, the grapple 12 may comprise a locking arrangement 40, adapted to assume at least one locking condition, in which the protruding length PL cannot be changed, and at least one unlocking condition, in which the protruding length PL can be changed.

As a non-limiting example, and as is illustrated in FIG. 4b, the base portion 24 may comprise a base abutment surface 42 and the at least one tine 28 may comprise a tine abutment surface 44. Further, the locking arrangement 40 comprises a locking member 46, preferably a pin, adapted to abut the base abutment surface 42 and the tine abutment surface 44 when the locking arrangement 40 assumes the locking condition.

Further, as is indicated in FIG. 4b, the base portion 24 may comprise a base opening 48 with a base opening rim 50 forming the base abutment surface 42. Instead of, or in addition to, the base opening 48, the at least one tine 28 may comprise a tine opening 52 with a tine opening rim 54 forming the tine abutment surface 44. However, it is also envisaged that the at least one of the abutment surfaces 42, 44 may be implemented in another way, for instance by furnishing the base portion 24 and/or the at least one tine 28 with a recess (not shown) the side wall(s) of which may form the abutment surface.

The configurations of the grapple 12 illustrated in FIG. 4a to FIG. 4c may be changed from the FIG. 4a configurations to the FIG. 4c configurations by arranging the locking arrangement 40 in an unlocking condition, e.g. by removing the locking member 46 as is indicated in FIG. 4b, moving the at least one tine 28 relative to the base portion 24 and thereafter arranging the locking arrangement 40 in an locking condition, e.g. by inserting the locking member 46 as is indicated in FIG. 4a and FIG. 4c.

The movement of the at least one tine 28 relative to the base portion 24 may be performed manually or by the use of appropriate equipment, such as an actuator or a jack.

Figure 5A:
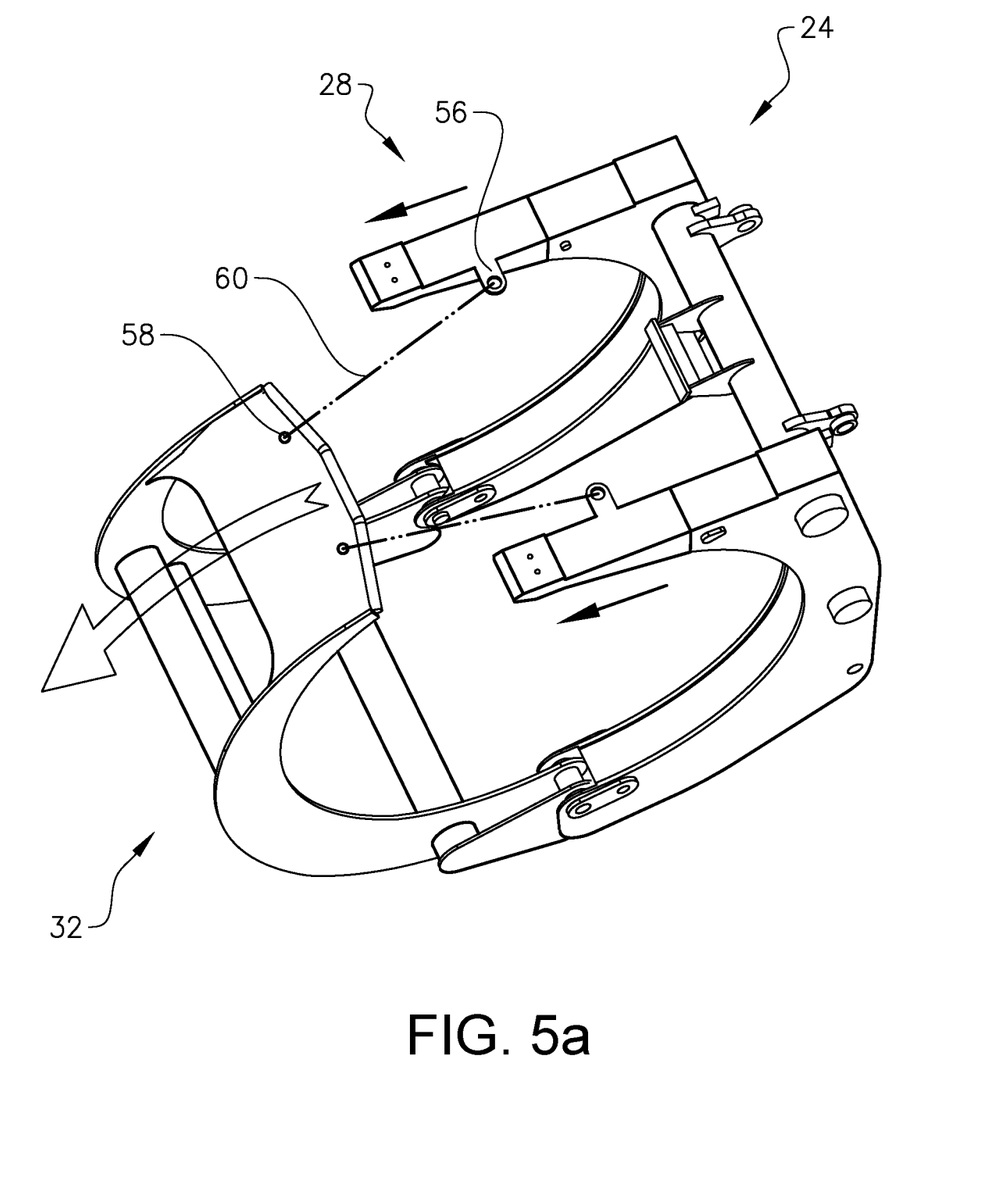
FIGS. 5a and 5b are schematic perspective views of a portion of an embodiment of a grapple.
Figure 5B:
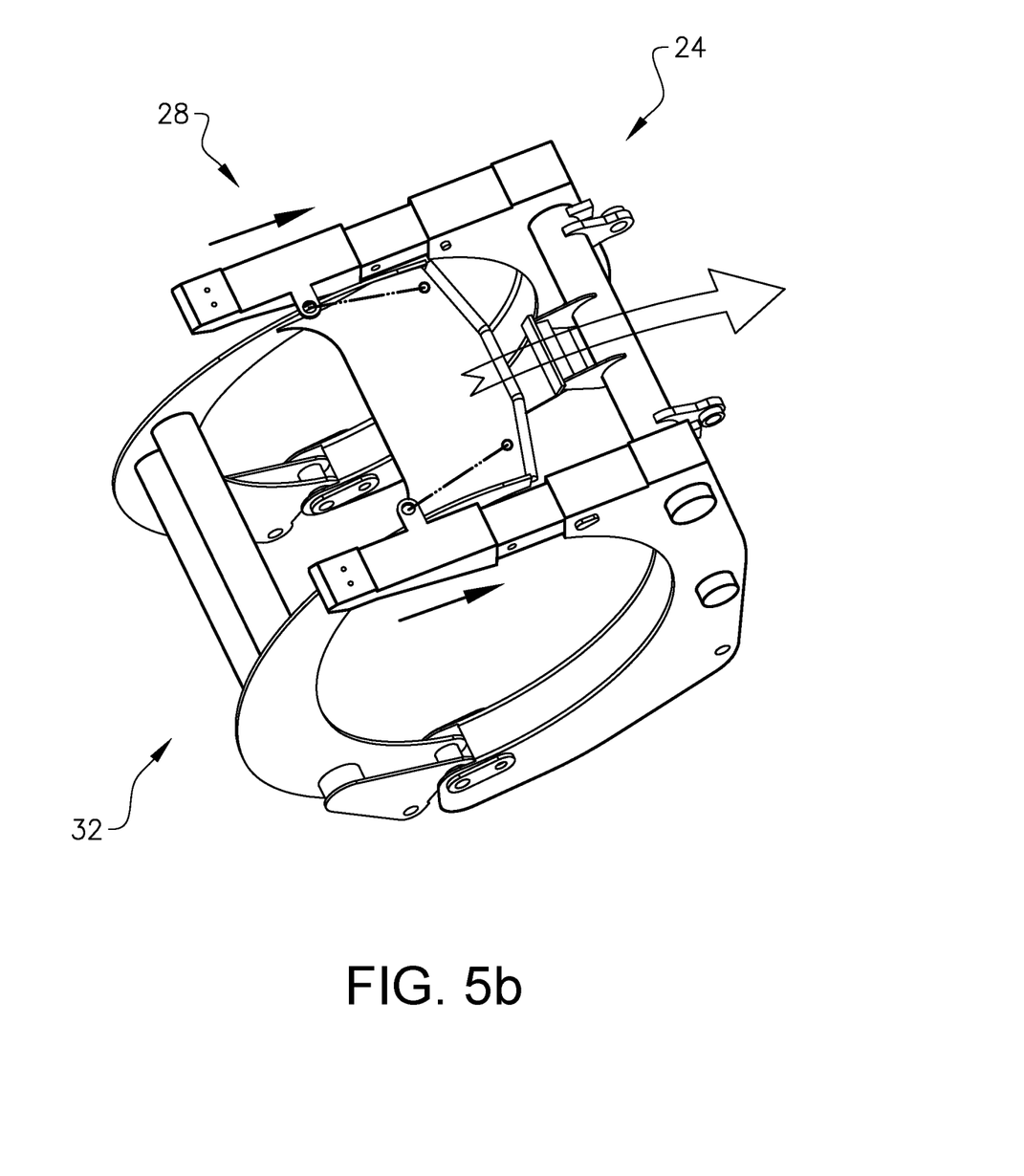

However, FIG. 5a and FIG. 5b illustrates an embodiment in which the grapple 12 comprises means for connecting the catch arm 32 and the at least one tine 28 such that such that a movement of the catch arm 32 relative to the base portion 24 can alter the protruding length PL of the at least one tine 28.

In the embodiment illustrated in FIG. 5a and FIG. 5b, the at least one tine 28 comprises a tine connector 56, here exemplified as a bracket, and the catch arm 32 comprises an catch arm connector, here exemplified as an eye 58 of the catch arm 32.

The catch arm connector 58 and the tine connector 56 are adapted to be connected to one another such that a movement of the catch arm 32 relative to the base portion 24 can alter the protruding length of the at least one tine 28.

To this end, although purely by way of example, the grapple 12 may comprise an intermediate connector 60 adapted to connect the catch arm connector 58 to the tine connector 56. In the embodiment illustrated in FIG. 5a to 5b, the intermediate connector 60 is exemplified as a chain although it is also conceivable that the intermediate connector 60 may comprise another type of component, such as a pin (not shown) or a wire (not shown) or any other component that is adapted to transfer a displacement of the catch arm 32 to the at least one tine 28. However, in certain embodiments of the grapple, it may be preferred to use a flexible intermediate connector, e.g. a chain and/or a wire.

Figure 6:
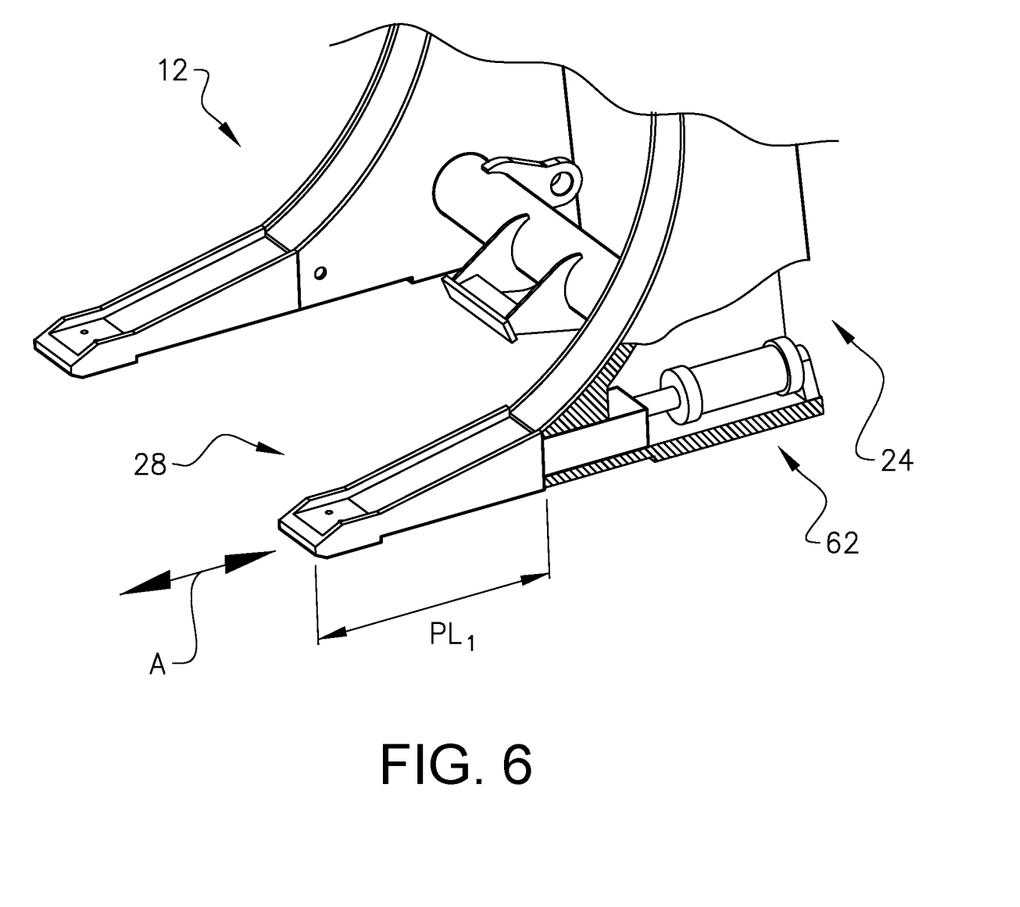
FIG. 6 is a schematic perspective view of a portion of an embodiment of a grapple.

FIG. 6 illustrates another embodiment of the grapple 12. In FIG. 6, the grapple 12 comprises a tine actuator 62, preferably a hydraulic tine actuator, connecting the at least one tine 28 and the base portion 24, for altering the protruding length PL of the at least one tine 28. The implementation of the tine actuator 62 in FIG. 6 is a linear actuator. Moreover, the tine actuator may also be adapted to assume a locking condition preventing displacement of the at least one tine 28 relative to the base portion 24. As such, by actuating the FIG. 6 actuator 62, the at least one tine 28 can move in the directions indicated by arrow A relative to the base portion 24.

One advantage with the tine actuator 62 illustrated in FIG. 6 is that the actuator may be remotely controlled. As such, an operator of a working machine comprising the FIG. 6 grapple 12 may alter the protruding length PL of the at least one tine 28 without necessarily having to leave the cabin of the work machine. For instance, the operator may actuate the tine actuator 62 by actuating a controller such as a lever, knob or the like (not shown) that is located within the cabin of the working machine.

It should be noted that tine actuator 62 need not be a linear actuator. For instance, in embodiments of the grapple 12 which comprises tine portions that are pivotable in relation to one another, such as the embodiment illustrated in FIGS. 3a and 3b, the tine actuator 62 may be adapted to impart a pivot motion on one of the tine portions relative to another tine portion and/or relative to the base portion. It is also envisaged that, in embodiments of the grapple, the tine actuator 62 may rotate the tine around the longitudinal axis of the tine to thereby alter the protruding length. In such an embodiment of the grapple 12, the base portion 24 may comprise a threaded opening (not shown) and the tine may also comprise threads (not shown).

Figure 7A:
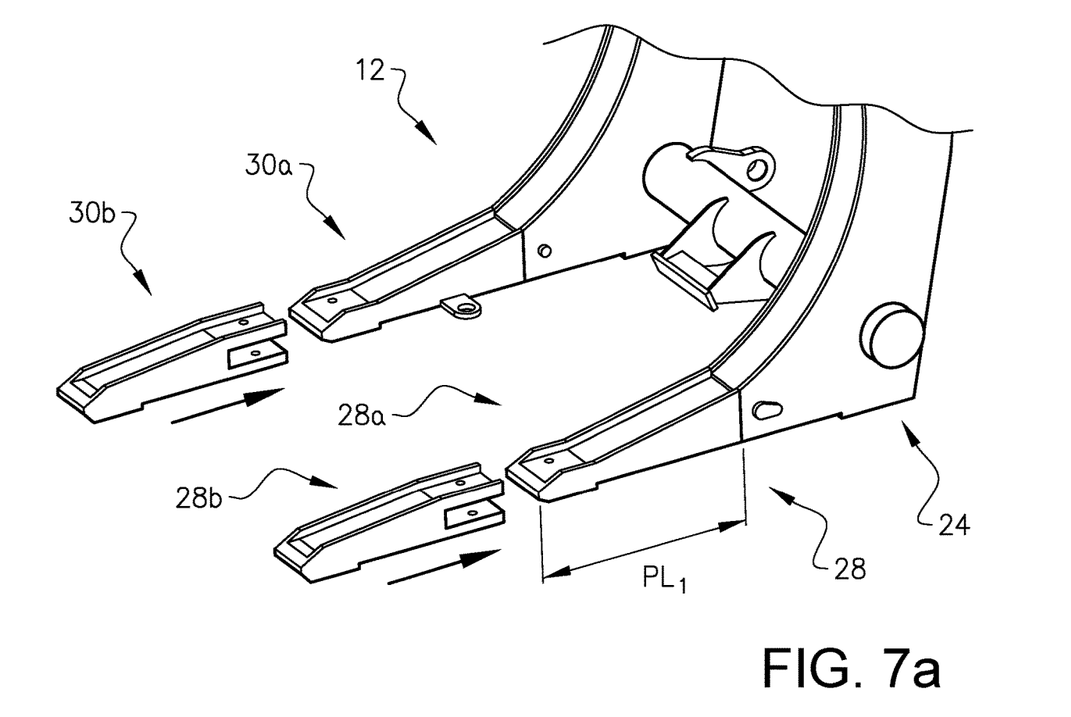
FIGS. 7a and 7b are schematic perspective views of a portion of an embodiment of a grapple.
Figure 7B:
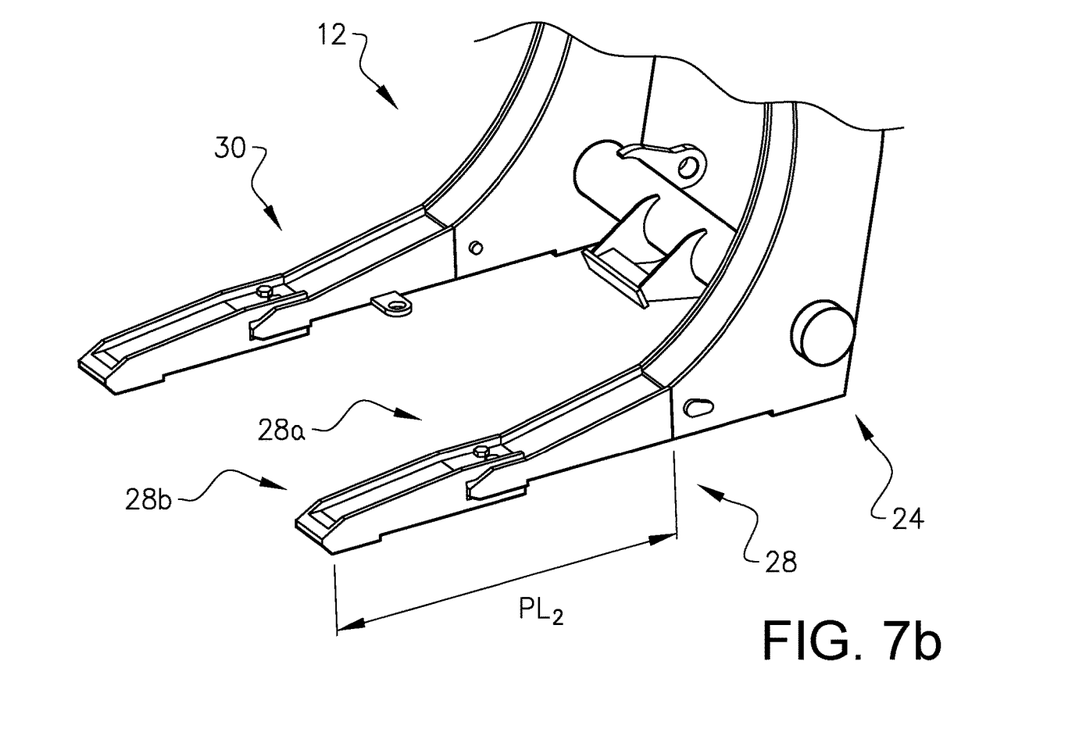

FIGS. 7a and 7b illustrates a further embodiment of the present invention. As may be gleaned from FIG. 7a, the at least one tine 28 may comprises an initial tine portion 28a, adapted to constitute the at least one tine in one configuration of the grapple 28. As such, in the FIG. 7a configuration, the tine 28 is constituted by the initial tine portion 28a resulting in a first protruding length PL of the tine 28. FIG. 7a further illustrates that the grapple 12 comprises a separate tine extension 28b adapted to be releasably attached to the initial tine portion 28a to thereby obtain a new configuration of the grapple. Such a new configuration is illustrated in FIG. 7b.

As such, in the FIG. 7b configuration, the at least one tine 28 is constituted by both the initial tine portion 28a and the separate tine extension 28b.

It should be noted that the concept presented hereinabove with relation to FIGS. 7a and 7b, viz a separate tine extension 28b connectable to an initial tine portion 28a, may be combined with an embodiment of the grapple 12 in which at least a portion of a tine 28 is moveable relative to the base portion 24 to thereby alter the protruding length PL.

Purely by way of example, each one of the embodiments discussed hereinabove with reference to FIG. 2 to FIG. 6, may be modified such that the tine 28 is adapted to receive a separate tine extension 28b. It is envisaged that the protruding length of the initial tine portion is firstly adjusted, using any one of the adjustment concept presented hereinabove with reference to any one of FIG. 2 to FIG. 6, and that the separate tine extension 28b is thereafter connected to the initial tine portion 28a to obtain another protruding length. However, it is also envisaged that the separate tine extension 28b is firstly connected to the initial tine portion 28a that the protruding length of the tine 28, constituted by the initial tine portion 28a and the separate tine portion 28b, is thereafter adjusted.

Moreover, it should be noted that the shortest protruding length PL of a tine may be relatively small. In fact, in embodiments of the grapple, the shortest protruding length PL may be zero, alternatively substantially zero.

Further, although the figures illustrate grapples with two tines that are parallel to one another, embodiments of the grapple 12 are also envisaged wherein two or more tines are non-parallel.

Figure 8:
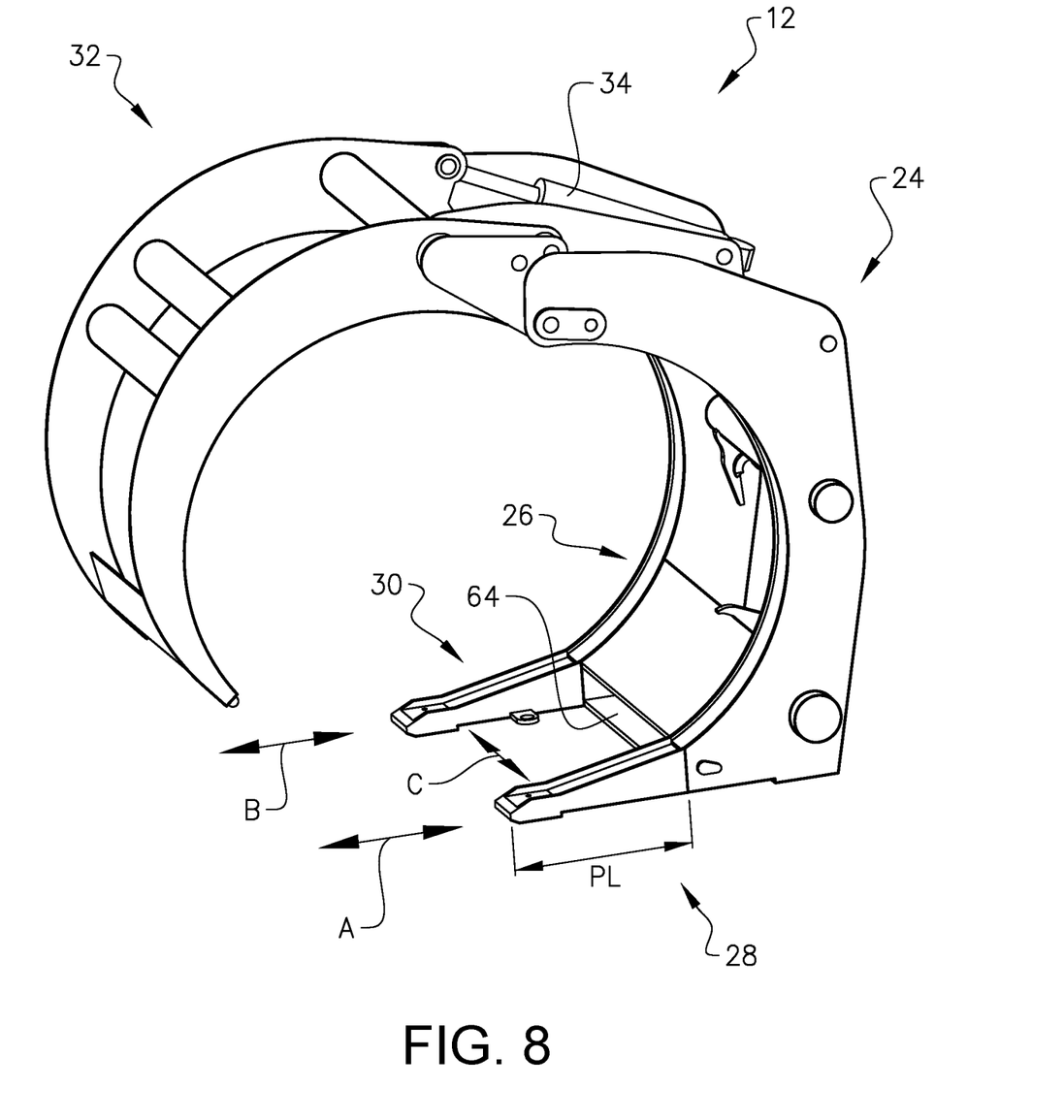
FIG. 8 is a schematic perspective view of a portion of an embodiment of a grapple.

FIG. 8 illustrates another embodiment of a grapple 12. In the FIG. 8 grapple 12, in addition to being adapted to assume configurations with different protruding lengths PL of the tines 28, 30, as indicated by arrows A and B in FIG. 8, the FIG. 8 grapple 12 can also assume configurations with different distances between the two tines 28, 30 as indicated by arrow C in FIG. 8. As such, in the FIG. 8 embodiment, the tines 28, 30 can be moved towards and away from each other, generally in a direction that is perpendicular to the direction in which the protruding length PL may be changed.

Purely be way of example, and as is indicated in FIG. 8, the ability to move the tines 28, 30 towards and away from each other may be obtained by slidably arranging at least portions of the tines 28, 30 in a grove 64 and the grapple may comprise a tine distance locking means (not shown) that can lock the position of the tines 28, 30 relative to one another. Embodiments of the grapple 12 may also comprise a tine distance actuating means (not shown), such as a hydraulic or electric actuator, for changing the distance between the tines 28, 30.

Figure 9A:
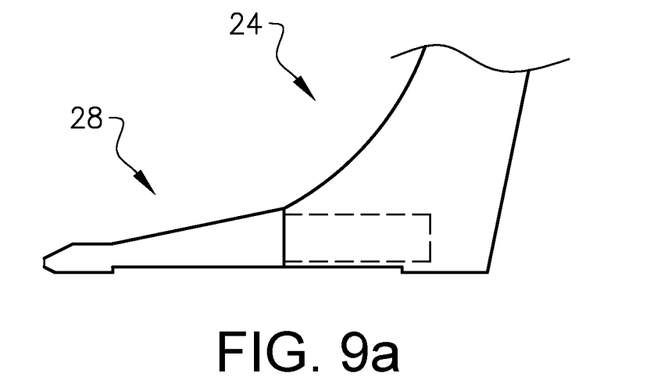
FIGS. 9a to 9c illustrate various alternatives for connecting a tine to a base portion.
Figure 9B:
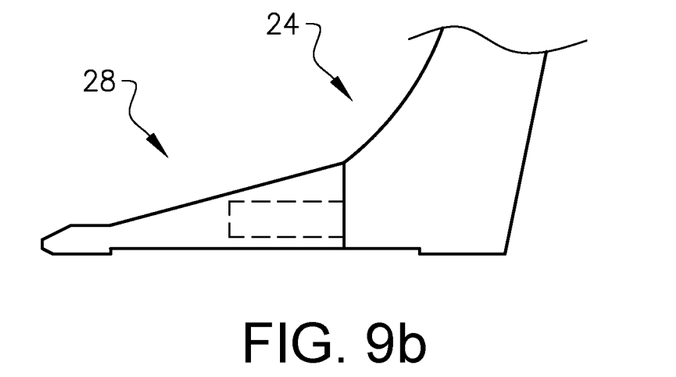
Figure 9C:
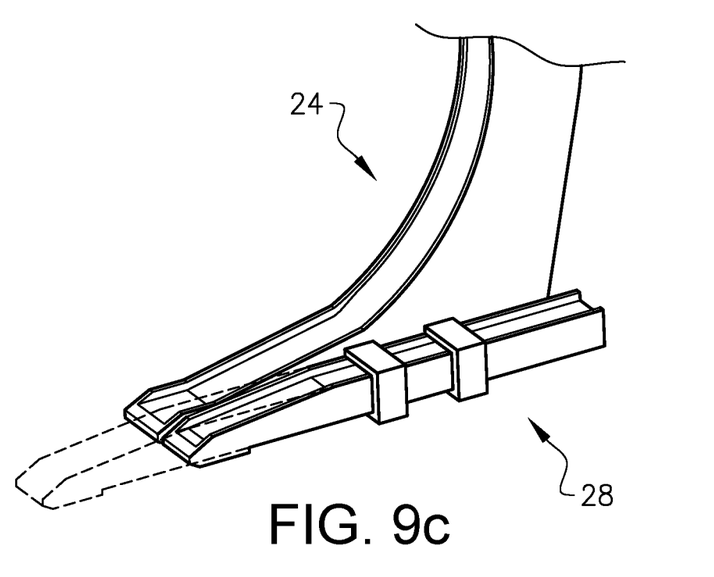

Moreover, it is also envisaged that the tine 28 may be connected to the base portion 24 in a plurality of different ways. To this end, reference is made to FIG. 9 that illustrates various connection alternatives. In the FIG. 9a alternative, at least a portion of the tine 28 extends into the base portion 24. Purely by way of example, the FIG. 9a tine 28 may extend into a cavity in the base portion 24. In the FIG. 9b alternative, a portion of the base portion 24 protrudes into a cavity of the tine 28. Further, in the FIG. 9c portion, the tine 28 is connected on a side of the base portion 24.

It is to be understood that the present invention is not limited to the embodiments described above and illustrated in the drawings; rather, the skilled person will recognize that many changes and modifications may be made.

The invention claimed is:

1. A grapple for handling logs, the grapple comprising a base portion connectable to a working machine portion and at least one tine connected to the base portion, the at least one tine having a protruding length from the base portion, the grapple further comprising a catch arm pivotably arranged relative to the base portion, wherein the grapple can assume configurations with different protruding lengths of the at least one tine,
wherein the grapple comprises means for connecting the catch arm and the at least one tine such that a movement of the catch arm relative to the base portion can alter the protruding length of the at least one tine.

2. The grapple according to claim 1, wherein the grapple can assume at least two gripping configurations, each one with an open condition and a closed condition, with different protruding lengths of the at least one tine.

3. The grapple according to claim 2, wherein the grapple is adapted to assume the open condition and closed condition, respectively, by pivoting the catch arm relative to the base portion.

4. The grapple according to claim 2, wherein the grapple is adapted to assume the open condition and closed condition, respectively, without pivoting the base portion relative to the working machine portion.

5. The grapple according to claim 1, wherein at least a portion of the at least one tine is adapted to be movable relative to the base portion for altering the protruding length of the at least one tine.

6. The grapple according to claim 5, wherein at least a portion of the at least one tine is adapted to be translatory movable relative to the base portion for altering the protruding length of the at least one tine.

7. The grapple according to claim 1, wherein the catch arm comprises a catch arm connector and the at least one tine comprises a tine connector, the catch arm connector and the tine connector being adapted to be connected to one another such that a movement of the catch arm relative to the base portion can alter the protruding length of the at least one tine.

8. The grapple according to claim 7, wherein the grapple further comprises an intermediate connector adapted to connect the catch arm connector to the tine connector, wherein the intermediate connector comprises at least one of a pin, a wire or a chain.

9. The grapple according to claim 1, wherein the at least one tine comprises an initial tine portion, adapted to constitute the at least one tine in one configuration of the grapple, and a separate tine extension adapted to be releasably attached to the initial tine portion to thereby obtain a new configuration of the grapple.

10. The grapple according to claim 1, wherein the at least one tine comprises two or more tines.

11. The grapple according to claim 10, wherein the grapple can assume configurations with different distances between the two or more tines.

12. A working machine comprising a grapple according to claim 1.

13. A method for changing a gripping configuration of a grapple, the grapple comprising a catch arm and a base portion for connection to a working machine portion and at least one tine connected to the base portion, the at least one tine having a protruding length from the base portion, wherein the catch arm is pivotably arranged relative to the base portion, the method comprising:
altering the protruding length of the at least one tine;
connecting a catch arm connector of the catch arm to a tine connector of the at least one tine; and
pivoting the catch arm relative to the base portion to thereby alter the protruding length of the at least one tine.

14. The method according to claim 13, further comprising connecting the catch arm connector to the tine connector by an intermediate connector, wherein the intermediate connector comprises at least one of a pin, a wire or a chain.

15. The method according to claim 13, wherein the at least one tine comprises an initial tine portion, adapted to constitute the at least one tine in one configuration of the grapple, and a separate tine extension, the step of altering the protruding length of the at least one tine comprising:
releasably attaching the separate tine extension to the initial tine portion.

* * * * *